United States Patent Office 3,004,006
Patented Oct. 10, 1961

3,004,006
OMEGA-HYDROXYPOLYOXYALKYLENEOXY-
BENZENE SULFONATES
Henry L. King and William A. H. Huffman, Decatur, Ala.,
assignors to The Chemstrand Corporation, Decatur,
Ala., a corporation of Delaware
No Drawing. Filed Nov. 29, 1957, Ser. No. 699,473
2 Claims. (Cl. 260—79.3)

This invention relates to a new class of compounds which are effective polyester modifiers and it relates more particularly to metal salts of omega-hydroxypolyoxyalkyleneoxybenzene sulfonic acids and a method for preparing these compounds.

In the preparation of high molecular weight polyesters such as those adapted to form cold-drawable fibers and filaments it has been desired to modify the polyesters so that they are more readily dyed. A copending application of William A. H. Huffman and William S. Wagner, Serial No. 694,116, filed November 4, 1957, discloses use of small amounts of omega-hydroxypolyoxyalkyleneoxybenzene sulfonates in making modified fiber-forming polyesters.

The novel omega-hydroxypolyoxyalkyleneoxybenzene sulfonates and methods for preparing the same are the subject of this invention. These omega-hydroxypolyoxyalkyleneoxybenzene sulfonates are metal salts of omega - hydroxypolyoxyalkyleneoxybenzene sulfonic acids, preferably alkali metal salts, and have molecular weights in the range of about 500 to about 5000.

The omega-hydroxypolyoxyalkyleneoxybenzene sulfonates may be represented by the general formula

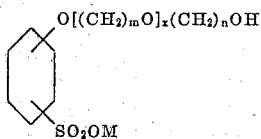

wherein $m$ and $n$ are integers from 2 to 4, $x$ is an integer from about 5 to about 125 and M is a metal ion; such as omega - hydroxypolyoxyethyleneoxybenzene sulfonates having the general formula

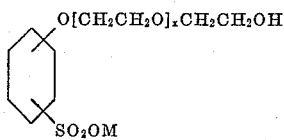

wherein $x$ is an integer from about 25 to 100 and M is an alkali metal cation: lithium, sodium or potassium. These novel compounds, when $x$ is from about 25 to 100, have molecular weights of about 1500 to about 3500.

These compounds are readily obtained by condensing an alkylene oxide such as ethylene oxide and an alkali metal hydroxybenzene sulfonate such as sodium p-phenol sulfonate in the presence of a basic catalyst such as sodium hydroxide, as will be more fully described hereinafter.

Any of the hydroxybenzene sulfonic acids or metal salts thereof may be used to prepare the compounds of this invention including ortho-hydroxybenzene sulfonic acid, meta-hydroxybenzene sulfonic acid and para-hydroxybenzene sulfonic acid, as well as the monosulfonic acid derivatives of ortho-cresol, meta-cresol and para-cresol, preferably in the form of alkali metal salts of the sulfonic acid group.

Any of the alkylene oxides may be used to make these compounds including ethylene oxide preferably, propylene oxide, butylene oxide, i.e. alkylene oxides containing two to four carbon atoms, and mixtures thereof. It will be understood of course that the novel compounds of this invention may be made by other methods than the condensation reaction of an alkylene oxide with a hydroxybenzene sulfonic acid.

The basic catalysts used in the process of this invention include the alkali metal hydroxides preferably, alkaline earth metal hydroxides and other basic metal oxides and hydroxides which are soluble in water. An amount of basic catalyst sufficient to establish a pH in the reaction mixture of greater than about 8 is normally employed. Large amounts of basic catalyst may be employed if desired, such as one mol of alkali metal hydroxide per mol of a hydroxybenzene sulfonate.

In general the process employed to prepare the omega-hydroxypolyoxyalkyleneoxybenzene sulfonate is a condensation reaction which is easily controlled and requires no special equipment. The equipment need only consist of a reaction vessel equipped to be heated and a stirrer. A preferred mode of operation involves mixing an alkali metal hydroxybenzene sulfonate or sulfonic acid, water and a basic catalyst in the reaction vessel. When a hydroxybenzene sulfonic acid is a starting material, enough metal hydroxide is used to react with the sulfonic acid group and to give a pH of the reaction mixture of greater than 8. While stirring this mixture the alkylene oxide is added to the vessel, preferably through an inlet tube below the surface of the water solution. The reaction normally proceeds readily at room temperature but may be accelerated by heating if desired. The molecular weight of the omega-hydroxypolyoxyalkyleneoxybenzene sulfonates is easily controlled by the amount of alkylene oxide added to the reaction mixture since the condensation reaction is straight-forward and rapid. To recover the omega-hydroxypolyoxyalkyleneoxybenzene sulfonate, the pH of the reaction mixture is adjusted to about neutrality as by the addition of solid carbon dioxide so as to neutralize the base used as catalyst. The water is removed from the reaction mixture under reduced pressure while heating the reaction vessel at steam bath temperatures. The metal carbonate formed during the neutralization period is separated by adding acetone to the reaction mixture and filtering to remove the carbonate. The acetone is then removed under reduced pressure while heating at steam bath temperature. The resulting products ordinarily require no further purification. The preparation of the compounds of this invention is illustrated in the following embodiments of the invention.

Sodium p-omega-hydroxypolyoxyethyleneoxybenzene sulfonate was prepared by stirring together 98 grams (0.5 mol) of sodium p-phenol sulfonate and 20 grams of sodium hydroxide dissolved in 400 ml. of water. Ethylene oxide was added to this stirred mixture through a gas inlet tube over a 6 hour period until 30 mols of ethylene oxide had reacted with the sodium p-phenol sulfonate as evidenced by a gain in weight of the reaction vessel equivalent to adding 30 mols of ethylene oxide. The pH was adjusted to about 8 by the addition of solid carbon dioxide. The water was removed from the reaction mixture under reduced pressure on a steam bath. Acetone was added to the mixture and the precipitated sodium carbonate was separated by filtration. The acetone was removed under reduced pressure on a steam bath. The compound was finally dried by azeotropic distillation with toluene. 735 grams of an essentially colorless viscous liquid remained which had an average molecular weight of 1470, a refractive index of 1.4749 $N_D 25°$ C., and a density of 1.172 25°/4°.

When this example is repeated by adding one-half or twice as many mols of ethylene oxide to the reaction mixture, sodium omega-hydroxypolyoxyethyleneoxybenzene sulfonates of molecular weights of about 750 and about 3000 are obtained. Likewise when ethylene oxide is replaced with propylene oxide, high molecular weight condensation products of the same nature are obtained.

The basic compound employed also may be potassium hydroxide or any other basic compound known to those skilled in the art as calcium hydroxide and the like. Of course, alkali or alkaline earth oxides may be employed, the hydroxide being formed when the oxides are mixed with the water. Likewise, other salts of p-phenol sulfonic acid may be employed such as the potassium and lithium salts, and the sodium or potassium phenolates may be employed as starting materials. Para-phenol sulfonic acid itself may be employed if desired, in which case enough potassium or sodium hydroxide should be used to neutralize the sulfonic acid groups. Other valuable condensation products are also readily prepared from sodium m-phenol sulfonate and from sodium meta-cresol and potassium para-cresol sulfonates.

The use of the novel compounds of this invention in making modified polyesters is demonstrated in the following example. A mixture of 82 grams of dimethyl terephthalate, 8.2 grams of sodium-p-omega-hydroxypolyoxyethyleneoxybenzene sulfonate having a molecular weight of 1475, 0.133 gram of trimethyl trimesate, 0.40 gram of zinc acetylacetonate, and 88 ml. of ethylene glycol, was heated in a reactor under nitrogen at 175° C. for 90 minutes until the methanol was removed and ester-interchange was complete. The reaction mixture was then heated at 285° C. to remove the excess ethylene glycol. The polymerization reaction was completed by heating the reaction mixture at 285° C. at less than 1 mm. pressure for 3 hours. The resulting polymer had a specific viscosity of 0.375. The polymer was melt spun to strong fibers which were machine drawn to a 5.8 draw ratio. The drawn fibers were readily dyed with the basic dye Sevron Blue B in an aqueous dye bath containing 10 percent of the dye, 5 percent ammonium acetate and 1 percent acetic acid, based on the weight of the fiber, by heating at 210–212° F. for 2 hours. Fibers of excellent color were obtained. Under the same dyeing conditions drawn fibers from unmodified polyethylene terephthalate were only faintly stained.

We claim:
1. A method for preparing an omega-hydroxypolyoxyalkyleneoxybenzene sulfonate of the general formula

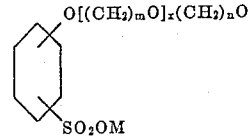

wherein $m$ and $n$ are integers from 2 to 4, $x$ is an integer from about 5 to about 125, and M is a metal selected from the group consisting of an alkali metal and alkaline earth metal comprising the steps of forming under standard room conditions as to temperature and pressure an aqueous mixture composed of enough water to dissolve the following constituents, a sulfonated monohydroxybenzene selected from the group consisting of monohydroxybenzene sulfonic acid, an alkali metal salt thereof, and an alkaline earth metal salt thereof and a base catalyst selected from the group consisting of an alkali metal hydroxide, an alkali metal oxide, an alkaline earth metal hydroxide, and an alkaline earth metal oxide, said base catalyst being present in an amount efficient to establish a pH in the resulting mixture of greater than about 8, introducing into said mixture an alkylene oxide having from 2 to 4 methylene groups per molecule in an amount such that $x+1$ mols of the alkylene oxide will add to the selected sulfonated monohydroxybenzene per mol thereof.

2. A method for preparing an alkali metal p-omega-hydroxypolyoxyethyleneoxybenzene sulfonate comprising the steps of forming under standard room conditions as to temperature and pressure an aqueous mixture containing enough water to dissolve the constituents, having a pH of greater than about 8 and composed of an alkali metal p-phenol sulfonate and an alkali metal hydroxide, introducing into the resulting mixture from 25 to 125 mols of ethylene oxide per mol of said sulfonate under conditions that induce the ethylene oxide to react with said sulfonate and thereby produce an alkali metal p-omega-hydroxypolyoxyethyleneoxybenzene sulfonate having from 25 to 125 recurring oxyethylene units.

References Cited in the file of this patent
UNITED STATES PATENTS

| 2,184,935 | Bruson | Dec. 26, 1939 |
| 2,828,334 | De Groote | Mar. 25, 1958 |